United States Patent [19]

Sakurai

[11] 3,805,291

[45] Apr. 16, 1974

[54] MAGNETIC HEAD HAVING IMPROVED HEAD GAP PORTION

[75] Inventor: Yo Sakurai, Kunitachi, Japan

[73] Assignee: Hitachi, Ltd., Tokyo, Japan

[22] Filed: Feb. 10, 1972

[21] Appl. No.: 225,227

[30] Foreign Application Priority Data

Feb. 10, 1971 Japan ................................. 46-5242

[52] U.S. Cl. ..................... 360/120, 29/603, 360/123

[51] Int. Cl. ........ G11b 5/20, G11b 5/40, G11b 5/22

[58] Field of Search ....... 179/100.2 C; 340/174.1 F; 346/74 MC; 29/603

[56] References Cited

UNITED STATES PATENTS

| | | | |
|---|---|---|---|
| 3,157,748 | 11/1964 | Eldredge | 179/100.2 C |
| 3,467,789 | 9/1969 | Johnson | 179/100.2 C |
| 3,629,519 | 12/1971 | Hanak | 179/100.2 C |
| 2,862,066 | 11/1958 | Thiele | 179/100.2 C |
| 3,549,825 | 12/1970 | Trimble | 179/100.2 C |

*Primary Examiner*—Bernard Konick
*Assistant Examiner*—Jay P. Lucas
*Attorney, Agent, or Firm*—Craig and Antonelli

[57] ABSTRACT

A magnetic head having a head coil formed by a thin copper plate embedded in the magnetic head gap at the vicinity of the foremost end of the head core and lead-out conductors connected electrically to respective ends of said copper plate and plated to essentially cover the sides of the head assembly.

5 Claims, 18 Drawing Figures

FIG. 4b1, FIG. 4b2, FIG. 4c1, FIG. 4c2, FIG. 4d1, FIG. 4d2, FIG. 4e, FIG. 4f

MAGNETIC HEAD HAVING IMPROVED HEAD GAP PORTION

BACKGROUND OF THE INVENTION

This invention relates to a magnetic head and a method for making it, which magnetic head is employed in magnetic recording devices, including memory devices for an electronic computer and the like, and more particularly to an improvement in the structure of the head gap portion and the head coil of such a magnetic head.

With the development of magnetic recording devices, such as color video tape recorders, magnetic disc memory devices for electronic computers, etc., it has become desirable to increase the storage capacity and storage density of the recording devices in order to make the devices compact and provide for a long duration of recording. In response to such desires, various improvements have been made in magnetic tapes and magnetic discs, which are used as the recording media. Now super high density recording employing wavelengths of 2 to 3 microns and a track width of below 100 microns has been achieved.

As a result, it has become necessary to improve the magnetic heads which constitute the essential element in the recording devices for performing the recording-reproducing or memory-reading operations, and particularly to improve the head gap portion of the magnetic head for obtaining a high electromagnetic transducing efficiency. Conventional magnetic heads for video tape recorders are subject to a plurality of inherent problems, such as low electromagnetic transducing efficiency, low sensitivity of the magnetic head for a very short recording wave range, etc.

SUMMARY OF THE INVENTION

It is, therefore, an object of the present invention to eliminate the above-mentioned problems which are inherent in conventional magnetic heads.

It is an object of the present invention to provide a magnetic head having a high electromagnetic transducing efficiency.

Another object of the present invention is to provide a magnetic head having a very compact size and a high electromagnetic transducing efficiency.

Another object of the present invention is to provide a magnetic head having relatively high sensitivity.

A further object of the present invention is to provide a method for producing a magnetic head having excellent magnetic characteristics.

A magnetic head according to the present invention comprises a head core having at least one magnetic gap formed at the central portion of the core, at least one thin electric conductor means situated within said magnetic gap at the vicinity of the foremost portion of the head core so as to contact a recording media, and a pair of suitable lead-out conductors connected to the ends of said conductor means. A head coil of the type provided by the present invention has at least one turn formed by said conductor means and the leads connected thereto.

According to the present invention, the length of the magnetic path formed between the recording media and the head core is considerably decreased and the effective cross-sectional area of the magnetic path is considerably increased. Therefore, the magnetic head obtained by the present invention has a very high electromagnetic transducing efficiency and a high sensitivity.

Other objects, features and advantages will become more apparent from the following detailed description taken in conjunction with the attached drawings.

BRIEF DESCRIPTION OF THE DRAWINGS

FIGS. 4*a* through 4*f* show various steps in the manufacture of a magnetic head core according to the present invention.

DETAILED DESCRIPTION OF THE INVENTION

Figure 1:
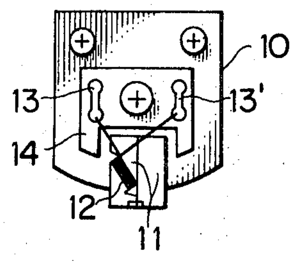
FIG. 1 PRIOR ART
FIG. 1 is a plan view of a known magnetic head.

The structure of one conventional magnetic head for a video tape recorder is as shown in FIG. 1. The magnetic head of this kind is composed of a head core tip 11, a head coil 12 wound around said core tip 11, a base plate 14 provided with lead terminals 13 and 13' for said coil 12, and a head base 10 on which the tip 11 is mounted. The base plate 14 is fixed to the main body of the video tape recorder (not shown).

Figure 2:
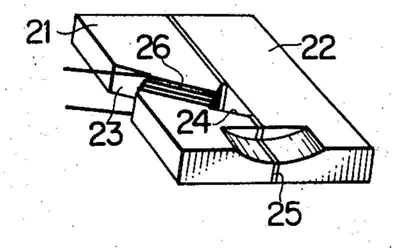
FIG. 2 PRIOR ART
FIG. 2 is a schematic perspective view of a conventional magnetic head core tip.

The detailed structure of the conventional head tip 11 is shown in FIG. 2. The head tip 11 comprises two plate-like core halves 21 and 22 which generally consist of a single crystal or high density sintered ferrite body and a gap spacer means 25 inserted between said two core halves 21 and 22 to form a magnetic head gap. The one of the core halves is provided on the interior and exterior sides with two V-shaped notches 23 and 24, and a coil 26 is wound around said core half 21 at said notches 23 and 24. Further, the fore-ends of the core halves 21 and 22, that is, the portions to be in contact with the recording media, are cut in an arc shape, as shown in FIG. 2, so that the thickness of said portion of the core halves corresponds to the width of a desired track of the recording media.

In the conventional magnetic head described above, since a hole is formed by the notch 24 provided on the interior side of the core half 21 at the central portion of the head core, the length of the effective magnetic path of the flux passing through the head coil 26 is relatively long, and moreover the effective cross-sectional area of said magnetic path is relatively small, whereby the reluctance of the head core becomes very high. Therefore, it has been very difficult to obtain a magnetic head of this type having a high electromagnetic transducing efficiency.

Furthermore, in order to record a very short recording wavelength, the width of the magnetic head gap of the core must be extremely short. When the magnetic head gap is small in the conventional magnetic head, the reluctance of the head gap at the fore side portion from the hole becomes relatively low. Therefore, the amount of flux passing through the head core at the fore side of the hole increases, and thereby, the sensitivity of the magnetic head is considerably decreased.

In a magnetic head for a disc file memory, the structure of the head gap portion of the head core is essentially identical with that of the aforesaid head for the video tape recorder. Accordingly, in the present specification, the description relates to a magnetic head of the type used in a video tape recorder and a method for making it.

Figure 3:
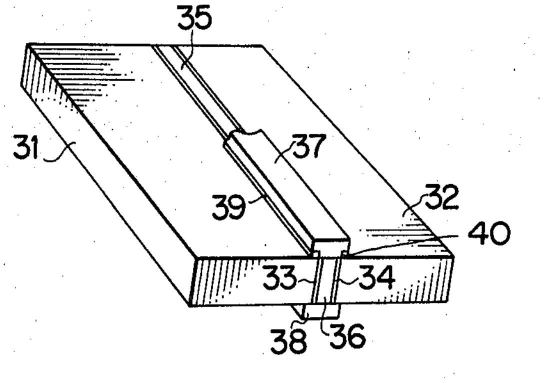
FIG. 3 is a perspective view of a magnetic head core tip according to one embodiment of the present invention.

FIG. 3 is a perspective view of the fundamental magnetic head construction according to the present invention.

The magnetic head, as shown in FIG. 3, comprises a pair of core halves 31 and 32, electric insulating thin layers 33 and 34 deposited on each of the gap-facing surfaces of said core halves 31 and 32, a gap spacer element 35 inserted between said core halves and adhering to said insulating layers, a thin conductor means 36 inserted in said head gap in the vicinity of the foremost end of the head gap, and suitable lead-out conductors 37 and 38 connected to both ends of said conductor means 36. In this case, the lead-out conductors 37 and 38 are electrically insulated from the core halves 31 and 32 by means of suitable insulators 39 and 40, which are placed between the core halves 31 and 32 and lead-out conductors 37 and 38. The magnetic head coil, according to the present embodiment, is constituted of said conductor means 36 and said leads 37 and 38.

Figure 4A:
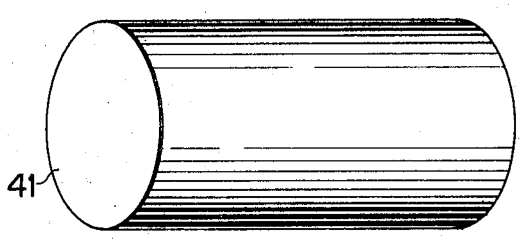
Figure 4A:
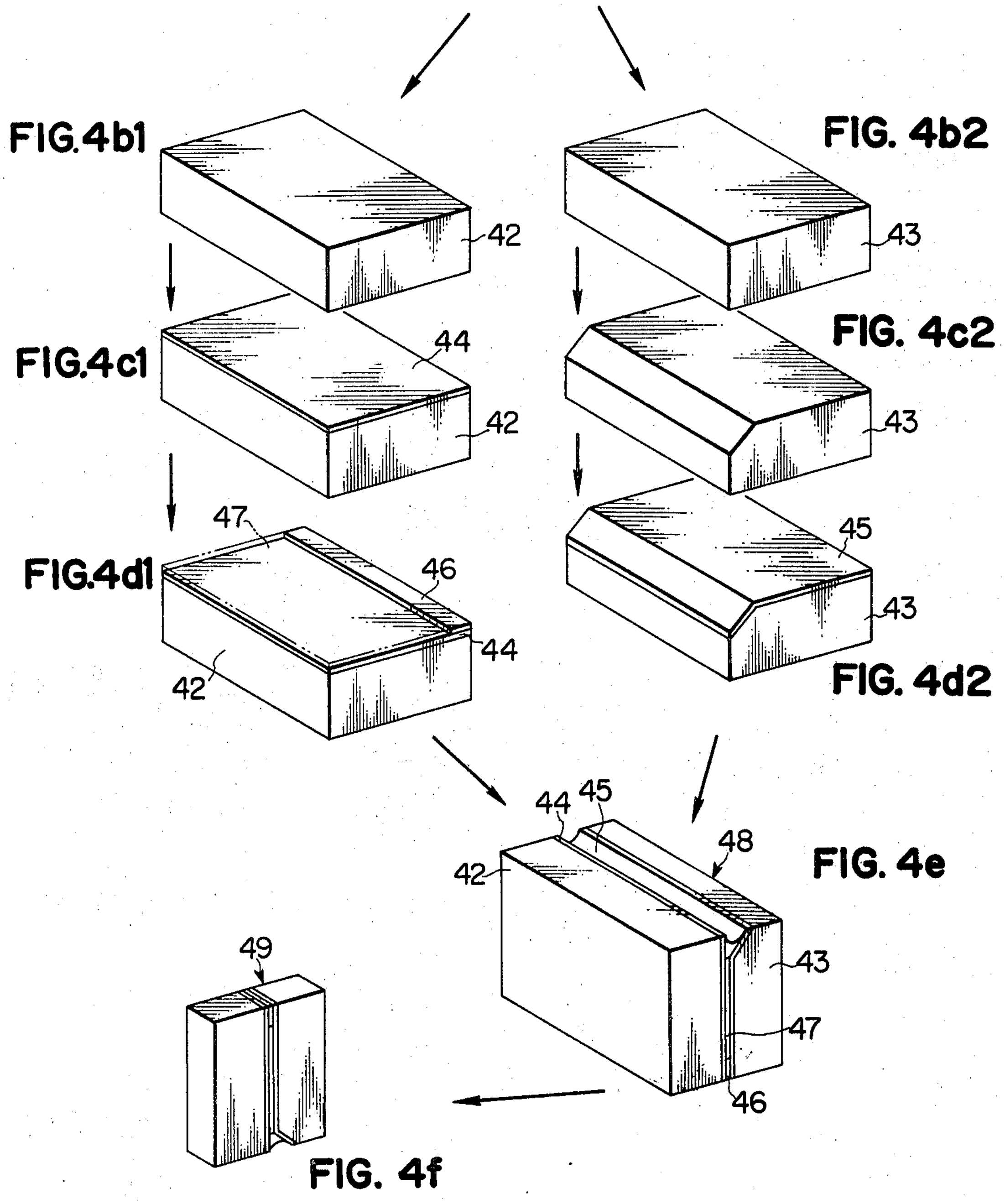

The magnetic head as mentioned above is produced by the steps illustrated in FIGS. 4a through 4f. As a starting material for the core 41, a ferromagnetic material having a relatively high hardness, such as a single crystal ferrite body or a high density hot-pressed ferrite sintered body of the Mn-Zn system or Ni-Zn system, as generally used. In case the material 41 is a single crystal ferrite body, a definite crystal orientation is selected, and the ferromagnetic material is cut in at least two slabs 42 and 43 having the shape of a rectangular parallelepiped, as seen in FIGS. 4*b*1 and 4b2.

The gap-facing surfaces of the slabs 42 and 43 are lapped, and then said surfaces are polished to a plane degree of about 0.1 $\mu$/5mm and a face coarseness of less than about 0.1 $\mu$.

Subsequently, one of the edges of the slabs, for example the slab 43 in FIG. 4*b*2 is slantingly cut off, as shown in FIG. 4*c*2.

Electric insulating thin layers 44 and 45 are then deposited on each gap-facing surface of the slabs 42 and 43, respectively, as seen in FIGS. 4*c*1 and 4*d*2. For this deposition, high frequency sputtering or chemical vapor deposition or the like can be adopted. These methods can produce well defined deposition layers with a flat surface. As the material of said insulating layer, it is desirable to use a non-magnetic material having a similar hardness and a heat expansion coefficiency as compared with said ferrite slabs; for example, silica, zirconia, alumina, titania, and the like may be used. In the case where a ferromagnetic material having a relatively high electric resistivity, such as hot-pressed ferrite, is used as the core material, however, said insulating layer may not be used.

A thin conductor means 46 having a constant thickness is placed on the insulating layer 44 along the fore end portion of the core half 42, as seen in FIG. 4*d*1. As the material of the conductor means 46, it is desirable to use a non-magnetic metal or alloys having high electric conductivity, such as copper, silver, aluminum, gold, platinum, and alloys thereof.

The conductor means 46 has a thickness corresponding to the sum of the thicknesses of the insulating layers 44 and 45, and the conductor means has a width substantially corresponding to the desired width of the magnetic head gap.

A spacer means 47 shown by the dotted line in FIG. 4*d*1 is further placed on said insulating layer 44 in the space left in the plane of the conductor means 46. The spacer means 47 is of a non-magnetic material similar to the insulating layer 44, and the two slabs 42 and 43 are bonded to each other by means of a suitable adhesive, such as an epoxy resin or glass interposed between the surfaces of said conductor means 46 and said spacer means 47 and the surface of said insulating layer 45, to thereby obtain a composite member 48, as seen in FIG. 4*e*.

When the composite member 48 is required to have great strength, said spacer means 47 may be replaced by a stronger material. For this purpose, the spacer may also be made by the step of pouring epoxy resin or molten glass into a space between the slabs 42 and 43, after bonding the two slabs 42 and 43 to each other at the conductor means 46.

The thus obtained composite member 48 is then sliced in the direction perpendicular to the lengthwise direction of the conductor means 46 to prepare a plurality of head core tips 49, as seen in FIG. 4*f*. In the slicing step, attention should be directed to the fact that the thickness of each of these head core tips 49 is selected so as to be substantially as close to the same desired track width as possible. This value is not critical and may be altered for various purposes.

Figure 5:
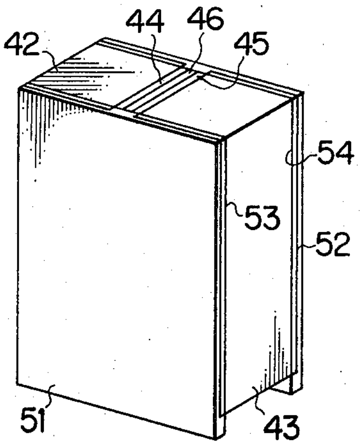
FIGS. 5 and 6 are perspective views of magnetic head core tips according to other embodiments of the present invention.

Insulating layers 53 and 54 are disposed between the head core tip 49 and the lead-out conductors 51 and 52 for electrically insulating the elements from each other, as seen in FIG. 5. As described above, the conductor means 46 must be connected to the lead-out conductors. When a material having an insulating characteristic, such as hot-pressed ferrite, is used for the head core tip, the insulating layers 53 and 54 are not necessary.

When the lead-out conductors 37 and 38 are soldered to the exposed ends of the conductor means 36 on both side surfaces of the core tip 49, a magnetic head having a head coil with one turn is formed thereby, as shown in FIG. 3. On the other hand, according to the above-mentioned embodiment, since the lead-out conductor layers 51 and 52 are deposited on the whole surface of the respective sides of the core tip 49, as shown in FIG. 5, the effective flux passing through the head coil increases and the electromagnetic transducing efficiency of that embodiment is thereby increased.

Figure 6:
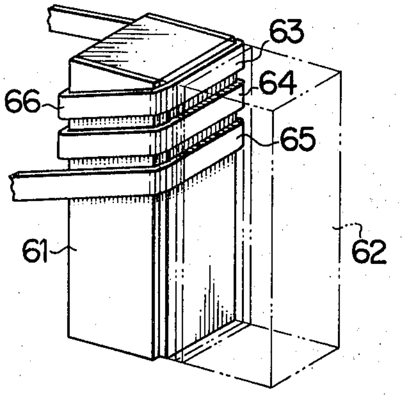

FIG. 6 shows a magnetic head according to another embodiment of the present invention. Plural conductor means 63, 64, and 65 are provided between said two core havles 61 and 62 and a lead-out conductor 66 is connected to said plural conductor means so as to form a single coil winding with said conductor means. In this way, it is easy to obtain a magnetic head having a head coil with the desired plural turns.

FIG. 7 shows a procedure for making a magnetic head in accordance with another embodiment of the present invention. Several conductor means 73, 73', . . . 73ⁿ, each of which forms substantially a one turn head coil, are deposited on the insulating layer 72 of the slab 71. These conductor means 73, 73', . . . $73^n$ are made by the steps, for example, of forming a metal layer 74 on said insulating layer 72 by vacuum vapor deposition or plating and of etching unnecessary portions of this metal layer using a conventional photoetching technique to leave desired metal portions of predetermined dimensions.

Figures 7A, 7B, 7C, 7D:
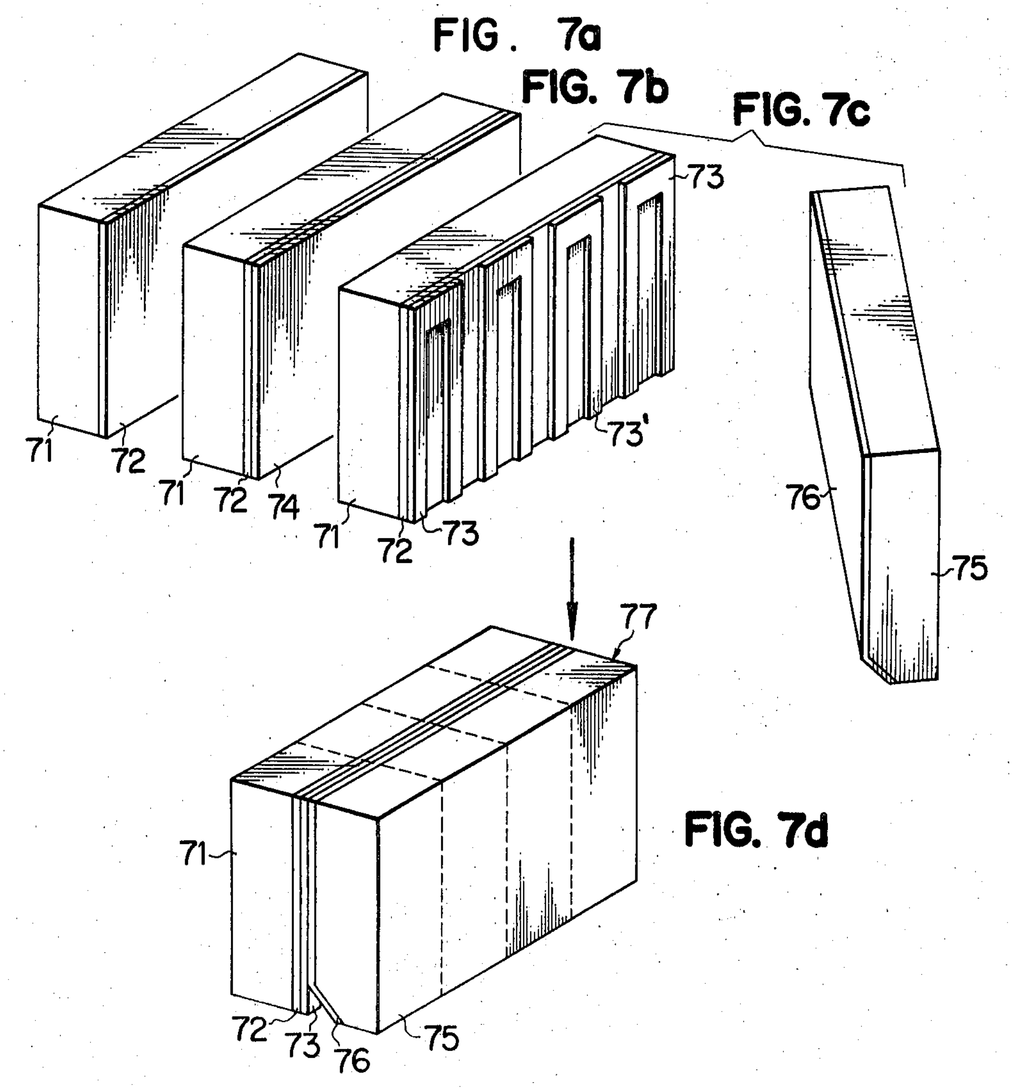
FIGS. 7*a* through 7*d* show various steps in the manufacture of another embodiment of the present invention.

Said slab 71 as mentioned above and another slab 75 having an insulating layer 76, similar to layer 45 shown in FIG. 4d2, are bonded to each other by means of a suitable adhesive to form a composite body 77. The thus obtained composite body 77 is sliced along the dotted lines, as seen in FIG. 7*d*, so that each sliced composite member has the necessary conductor means, and thereby a plurality of head core tips are made. Each of these head core tips has a thickness corresponding to the dimension of the track width.

As in the embodiment described before, insulating layers may be disposed between the head core tips and the lead-out conductors for electrically insulating the elements from each other. The lead-out conductors are soldered or bonded to both exposed ends of the conductor means 73 on the rear end of the head core tip.

In the magnetic head according to the present invention, since the part of the head coil which pierces the head core is embedded in the magnetic head gap, the length of the effective magnetic path passing through the head coil is considerably shortened and the cross-sectional area of said magnetic path is increased. Therefore, the electromagnetic transducing efficiency of the magnetic head increases remarkably as compared with the conventional magnetic head. For example, the reproducing electromagnetic transducing efficiency of the magnetic head, as shown in FIG. 3, is higher by about 10 dB than that of the conventional magnetic head shown in FIG. 2.

Furthermore, in the magnetic head according to the present invention, the conductor means is provided at the vicinity of the foremost end of the magnetic gap, so that leakage of the flux passing through fore side of the head coil is effectively eliminated. Therefore, the magnetic head of the present invention has a high sensitivity as compared with the conventional one. Furthermore, the procedure of the present invention is suitable for mass production of the magnetic head, since the coil winding is remarkably simple.

It should be understood that the detailed description and specific examples, while indicating preferred embodiments of the present invention, are given by way of illustration only and various changes and modifications are possible without departing from the scope and spirit of the present invention which will become apparent to those skilled in the art from the detailed description.

What is claimed is:

1. A magnetic head comprising a ferromagnetic head core including first and second core halves entirely spaced from each other to provide a magnetic gap at the central portion of the core, a non-magnetic conductor insulatingly disposed within said magnetic gap at one end thereof and said non-magnetic conductor having one end in the vicinity of the foremost portion of the head core so as to come in contact with a recording media, the remainder of said gap being filled with a non-magnetic spacer, and a pair of lead-out conductors deposited on substantially the entire surface of the respective sides of said core and connected electrically with the respective ends of said non-magnetic conductor.

2. A magnetic head according to claim 1 in which said non-magnetic spacer is formed of a substance selected from the group consisting of silica, zirconia, alumina and titania.

3. A magnetic head according to claim 1 in which said non-magnetic conductor is formed of a substance selected from the group consisting of copper, silver, aluminum, gold, platinum and alloys thereof.

4. A magnetic head according to claim 1 wherein said non-magnetic conductor is substantially U-shaped.

5. A magnetic head according to claim 1 wherein said lead-out conductors are insulated from said core halves by means of insulators.

* * * * *